(12) United States Patent
Sun et al.

(10) Patent No.: US 9,067,794 B1
(45) Date of Patent: Jun. 30, 2015

(54) HIGHLY THERMAL CONDUCTIVE NANOCOMPOSITES

(75) Inventors: Ya-Ping Sun, Clemson, SC (US); John W. Connell, Yorktown, VA (US); Lucia Monica Veca, Arges (RO)

(73) Assignee: The United States of America as represented by the Administrator of the National Aeronautics and Space Adminstration, Washington, DC (US)

( * ) Notice: Subject to any disclaimer, the term of this patent is extended or adjusted under 35 U.S.C. 154(b) by 1614 days.

(21) Appl. No.: 12/536,153

(22) Filed: Aug. 5, 2009

Related U.S. Application Data (60) Provisional application No. 61/086,511, filed on Aug. 6, 2008.

(51) Int. Cl.
| | | |
|---|---|---|
| *C01B 31/04* | (2006.01) | |
| *C08K 9/00* | (2006.01) | |
| *C08L 63/00* | (2006.01) | |
| *C08K 3/04* | (2006.01) | |

(52) U.S. Cl.
CPC ......... *C01B 31/0415* (2013.01); *C01B 31/0423* (2013.01); *C08K 3/04* (2013.01)

(58) Field of Classification Search
USPC ......... 252/71, 73, 70; 423/448; 977/755, 778, 977/783; 523/215, 468
See application file for complete search history.

(56) References Cited

U.S. PATENT DOCUMENTS

| | | | |
|---|---|---|---|
| 4,799,956 A * | 1/1989 | Vogel ............................. | 75/243 |
| 6,872,330 B2 | 3/2005 | Mack et al. | |
| 7,071,258 B1 | 7/2006 | Jang et al. | |
| 7,550,529 B2 * | 6/2009 | Drzal et al. .................... | 524/424 |
| 2003/0129305 A1 | 7/2003 | Wu et al. | |
| 2004/0127621 A1 | 7/2004 | Drzal et al. | |
| 2006/0148965 A1 * | 7/2006 | Drzal et al. .................... | 524/496 |
| 2006/0148966 A1 * | 7/2006 | Drzal et al. .................... | 524/496 |
| 2006/0229404 A1 * | 10/2006 | Lechtenboehmer .......... | 524/495 |
| 2007/0092432 A1 * | 4/2007 | Prud'Homme et al. ....... | 423/448 |
| 2007/0158618 A1 * | 7/2007 | Song et al. .................... | 252/500 |
| 2008/0279756 A1 * | 11/2008 | Zhamu et al. ................. | 423/448 |
| 2009/0022649 A1 * | 1/2009 | Zhamu et al. ............... | 423/415.1 |
| 2010/0036023 A1 * | 2/2010 | Weng et al. ..................... | 524/13 |
| 2010/0147188 A1 * | 6/2010 | Mamak et al. ............. | 106/31.13 |
| 2011/0014111 A1 * | 1/2011 | Leugers et al. ............ | 423/415.1 |
| 2013/0136684 A1 * | 5/2013 | Wu et al. ....................... | 423/448 |

* cited by examiner

*Primary Examiner* — Jane L Stanley (74) *Attorney, Agent, or Firm* — Jennifer L. Riley; Andrea Z. Warmbier; Helen M. Galus (57) ABSTRACT

Disclosed are methods for forming carbon-based fillers as may be utilized in forming highly thermal conductive nanocomposite materials. Formation methods include treatment of an expanded graphite with an alcohol/water mixture followed by further exfoliation of the graphite to form extremely thin carbon nanosheets that are on the order of between about 2 and about 10 nanometers in thickness. Disclosed carbon nanosheets can be functionalized and/or can be incorporated in nanocomposites with extremely high thermal conductivities. Disclosed methods and materials can prove highly valuable in many technological applications including, for instance, in formation of heat management materials for protective clothing and as may be useful in space exploration or in others that require efficient yet light-weight and flexible thermal management solutions.

20 Claims, 7 Drawing Sheets

HIGHLY THERMAL CONDUCTIVE NANOCOMPOSITES

FEDERALLY SPONSORED RESEARCH

The United States Government may have rights to this invention pursuant to grants from the National Aeronautics and Space Administration (Grant No. NNL06AA03A) and the National Science Foundation (Grant No. EPS-0132573).

CROSS REFERENCE TO RELATED APPLICATION

The present application claims filing benefit of U.S. Provisional Patent Application No. 61/086,511 having a filing date of Aug. 6, 2008, which is incorporated herein by reference in its entirety.

BACKGROUND

Among other beneficial characteristics, carbon materials are known for their thermal conductive properties. For instance, carbon nanotubes, with individual nanotube thermal conductivity of 3,000 W/mK measured experimentally and up to 6,600 W/mK predicted from theoretical calculations, have generated much excitement with regard to their potential use in forming polymeric nanocomposites with ultrahigh thermal conductivities. So far, however, such nanocomposites have not been produced.

There has also been interest in the use of exfoliated graphite in forming thermally conductive nanocomposites. For example, Drzal and coworkers reported that graphite could be intercalated through chemical oxidation treatment and then rapidly exfoliated at higher temperature and that the exfoliated graphite could be dispersed into polymeric matrices including nylons and polyethylene for composites of enhanced thermal conductivities (see, e.g., Fukushima, et al., *J. Therm. Anal. Cal.* 85, 235-238 (2006); Kalaitzidou, et al., *Carbon*, 45, 1446-1452 (2007)). In this research, it was found that the thermal conductivity of a composite increased almost linearly with the graphite loading, up to 4.1 W $m^{-1}K^{-1}$ in a composite of nylon 6 with 20 vol % exfoliated graphite (compared to only 0.25 W $m^{-1}K^{-1}$ for the blank polymer).

Similarly, Haddon and coworkers processed natural graphite flakes into "graphite nanoplatelets" by initial treatment with a mixture of concentrated sulfuric acid and nitric acid for intercalation followed by exfoliation through thermal shock on rapid exposure of the intercalated graphite to various high temperatures in nitrogen (Yu, et al., *J. Phys. Chem. C* 111, 7565-7569 (2007)). The graphite nanoplatelets (GNPs) thus obtained were dispersed through a post-processing treatment for the fabrication of composites with epoxy. These GNP-epoxy composites were found to have thermal conductivities up to 6.44 W $m^{-1}K^{-1}$ at 25 vol % GNP loading, considerably higher than that of the blank epoxy.

U.S. Pat. No. 7,071,258 to Jang, et al. discloses a method for forming nano-scaled graphene plates that includes partially or fully carbonizing a precursor polymer or heat-treating petroleum or coal tar pitch to produce polymeric carbon containing micron- and/or nanometer-scaled graphite crystallites, exfoliating the thus formed graphite crystallites, and then subjecting the polymeric carbon containing exfoliated graphite crystallites to a mechanical attrition treatment such as ball milling.

U.S. Patent Application Publication No. 2004/0127621 to Drzal, et al. discloses a method for forming graphite nanoplatelets from expanded graphite as well as composites and products produced therefrom. The method of expanding the graphite is by microwaves or other radiofrequency wave treatment of intercalated graphite. Following expansion, the graphite is then crushed to a size of 200 microns or less in size. The expanded graphite can be used in forming polymer composites.

Connell and coworkers compared different nanoscale carbon fillers including multiple-walled carbon nanotubes (MWNTs), vapor-grown nanofibers, and commercially available expanded graphite in Ultem™ 1000 resin for enhanced thermal conductivities in extruded composite ribbons (Ghose, et al., *High Performance Polymers* 18, 961-977 (2006)). The expanded graphite was found to be more effective than the other fillers, with the in-plane thermal conductivity reaching 6.7 W $m^{-1}K^{-1}$ in the ribbon sample containing 40 wt % graphite.

While the above describe improvements in the art, room for additional improvement exists. What are needed in the art are relatively simple, efficient and inexpensive methods for preparing carbon-based fillers as may be used in forming highly thermal conductive composites.

SUMMARY

According to one embodiment, disclosed is a method for forming a carbon nanosheet. For instance, a method can include combining an expanded graphite with a mixture comprising water and an alcohol to form a graphite mixture. The method can also include sonicating the graphite mixture. Following sonication, the graphite can be combined with an intercalant and abraded. The final exfoliated graphite can include a carbon nanosheet having a thickness of between about 2 nanometers and about 10 nanometers.

The starting expanded graphite can be an exfoliated graphite or an intercalated graphite. In one embodiment, a method can include forming the starting material.

Any suitable alcohol can be used in the process. For example, methanol, ethanol, propanol, or a diol can be used. In general, the mixture comprising the water and the alcohol can include the water and the alcohol in a volume ratio of between about 1:9 and about 9:1.

Similarly, any suitable intercalant can be used. By way of example, an intercalant can include a strong acid. For instance, a mixture of nitric acid and sulfuric acid can be used.

The final intercalated graphite can be abraded and exfoliated according to any known method such as milling, sonication, the application of heat, or by a combination thereof.

In one embodiment, a method can also include binding a compound to a carboxylic acid moiety of a carbon nanosheet so as to form a functionalized carbon nanosheet. For instance, a polymer can be bound to a carbon nanosheet.

A method can also include incorporating a carbon nanosheet into a matrix material to form a composite. For example, a composite can be a thermoset polymer system or a thermoplastic polymer system.

Also disclosed herein are composites that can be formed according to disclosed methods. In general, a composite can include a matrix material and a plurality of functionalized carbon nanosheets incorporated in the matrix. In one preferred embodiment, a composite can include polymer functionalized carbon nanosheets incorporated into a matrix.

A matrix material can be, for instance, a polymer such as a poly(vinyl alcohol), an epoxy polymer, or a polyimide, or the matrix material can be a nonpoylmeric material such as a ceramic, a glass, a carbon, or a metal. In one preferred embodiment, the matrix material and the functionalization compound of the carbon nanosheet can be the same material.

Disclosed materials can exhibit excellent physical characteristics. For instance, disclosed composites can exhibit a cross-plane thermal diffusivity that is between about one-tenth and about one-fifth of the average in-plane thermal diffusivity.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying Figures, in which.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

In general, disclosed herein are methods for forming carbon-based fillers as may be utilized in forming highly thermal conductive nanocomposite materials. More specifically, methods disclosed herein include processes that can be used to further exfoliate graphite starting materials to form extremely thin carbon structures (termed carbon nanosheets herein) that can be on the order of between about 2 and about 10 nanometers in thickness. Beneficially, disclosed carbon nanosheets can in one embodiment be formed according to relatively inexpensive processing techniques from commercially available graphite or expanded graphite.

Carbon nanosheets as formed herein can be incorporated as fillers with matrix materials to produce nanocomposites with extremely high thermal conductivities. Disclosed methods and materials can prove highly valuable in many technological applications including, for instance, in formation of heat management materials for protective clothing (chem-bio suits, for example) and materials as may be useful in space exploration (such as advanced extravehicular activity (EVA) systems). Moreover, as composites including disclosed carbon nanosheets can be highly anisotropic with regard to thermal conductivity, they can be highly amenable to applications that require efficient directional thermal transport.

Disclosed carbon nanosheets can be formed from natural graphite or optionally from expanded or exfoliated graphite, for instance from commercially available flake graphite.

As used in the present disclosure, the term 'expanded graphite' generally refers to a graphite that has been heated to increase the space between platelets of graphite. Expanded graphite usually does not have any significant order as evidenced by an x-ray diffraction pattern.

As utilized herein, 'exfoliated graphite' generally refers to a form of expanded graphite in which graphite platelets have been separated from one another by heating with or without an agent such as a polymer or polymer component. In general, exfoliated graphite comprises a number of individual graphene sheets, which are stacked in various configurations. For instance, exfoliated graphite sheets are generally less than about 20 nm in thickness.

As mentioned, starting material for disclosed methods can include graphite that has not been expanded. According to this embodiment, the starting material can first be expanded according to any known process. The earliest patents related to formation of exfoliated graphite appeared as early as 1915 (e.g., U.S. Pat. No. 1,137,373 to Aylsworth and U.S. Pat. No. 1,191,383 to Shane, et al.). Many patents have been issued related to graphite expansion since that time (e.g., U.S. Pat. No. 4,915,925 to Chung and U.S. Pat. No. 6,149,972 to Greinke), as well as to grinding/pulverization methods for expanded graphite to produce fine graphite flakes (U.S. Pat. No. 6,287,694 to Zaleski, et al., U.S. Pat. No. 5,330,680 to Sakawaki, et al. and U.S. Pat. No. 5,186,919 to Bunnell). (All of these patents are incorporated herein by reference.) Methods disclosed in these patents utilize heat treatment, typically in a range between 600° C. and 1200° C., to obtain the expansion of graphite.

Methods for intercalation of graphite are generally known in the art, any of which can be utilized in the disclosed technologies. In general, an intercalation method includes treating particles of graphite, such as natural graphite flake, with an intercalant of e.g., a solution of sulfuric and nitric acid, following which the crystal structure of the graphite reacts with the intercalant to form a compound of graphite and the intercalant. The treated particles of graphite are generally referred to as intercalated graphite flake. Upon exposure to elevated temperatures, the particles of intercalated graphite can expand in dimension in an accordion-like fashion in the direction perpendicular to the basal planes of the graphene.

An intercalant can include oxidizing agents generally known in the art. Examples include compositions including oxidizing agents and oxidizing mixtures, such as solutions of nitric acid, potassium chlorate, chromic acid, potassium permanganate, potassium chromate, potassium dichromate, perchloric acid, and the like. Mixtures of materials are encompassed, such as, for example, a mixture including concentrated nitric acid and chlorate, a mixture including chromic acid and phosphoric acid, a mixture including sulfuric acid and nitric acid, or mixtures of a strong organic acid, e.g. trifluoroacetic acid, and a strong oxidizing agent that is soluble in the organic acid.

In one embodiment, an intercalant can be a solution of sulfuric acid, or a solution of sulfuric acid and phosphoric acid, and an oxidizing agent, i.e. nitric acid, perchloric acid, chromic acid, potassium permanganate, iodic or periodic acids, or the like, and can also include an expansion aid. An intercalant may contain metal halides such as ferric chloride, ferric chloride mixed with sulfuric acid, or a halogen, such as bromine as a solution of bromine and sulfuric acid or bromine in an organic solvent.

An intercalated graphite can be exfoliated according to any standard method. For instance, as previously mentioned, an intercalated graphite can be exposed to heat, e.g., between about 600° C. and 1200° C. to obtain the expansion and exfoliation of the graphite. Optionally, a foaming agent or blowing agent can be utilized such as water, volatile liquids, e.g., liquid nitrogen, and the like. When a foaming or blowing agent is utilized, the expansion of the intercalated graphite can be achieved by subjecting the graphite to a temperature sufficient to produce a gas pressure which is effective to bring about an almost instantaneous and maximum expansion of the graphite. For instance, when the expanding agent is water, the graphite having water incorporated in the structure can be rapidly heated or subjected to a temperature above about 100° C. which can induce a substantially instantaneous and full expansion of the graphite.

According to the present disclosure, an expanded graphite, e.g., a commercially available expanded graphite or an expanded graphite formed according to any suitable process, can be further expanded/exfoliated according to a relatively simple chemical process to form extremely thin carbon nanosheets. For example, carbon nanosheets as may be formed as disclosed herein can generally have a thickness of less than about 10 nm, for instance between about 2 nm and about 10 nm, or between about 2 nm and about 8 nm.

In forming disclosed carbon nanosheets, an expanded graphite (e.g., an intercalated graphite or an exfoliated graphite) can first be added to an alcohol-water mixture. For example, an ethanol-water mixture at a volume ratio of between about 9:1 and about 1:9, for instance at about 13:7 v/v. In general, any alcohol, e.g., methanol, ethanol, propanol, and the like, can be used, including diols such as ethylene glycol. This mixture can be stirred and then sonicated for a period. Both stirring and sonication can be carried out at room temperature, though this is not a requirement of the disclosed processes. Stirring can generally take place for several hours, for instance, between about 12 and about 72 hours, or about 24 hours, in one embodiment. Sonication can generally be carried out at between about 50 W and about 250 W, for example at about 120W for between about 12 and about 72 hours, for instance for about 20 hours. The sample can then be collected and dried prior to further processing.

Following the alcohol/water treatment, the resulting graphite sample can be further processed according to an intercalation and exfoliation process. For instance, the sample can be combined with an intercalant as previously described (e.g., a nitric acid and sulfuric acid mixture, or the like) and exfoliated through subjection to abrading via, e.g., sonication, milling, or the like, through heating as described above with regard to initial exfoliation processes, or through any other suitable process to form extremely thin carbon nanosheets. For example, a sample can be combined with an intercalant and sonicated for a period between about two and about three days at a power level between about 50 W and about 250 W, for example at about 120 W. The carbon nanosheets thus formed can be collected, washed, and dried.

Surprisingly, through treating an expanded graphite with an alcohol solution followed by an expansion process, the graphite sheets of the expanded graphite starting material can be further split to form sheets only a few graphene layers in depth. Moreover, when incorporated as filler into a nanocomposite material, the composite materials can exhibit surprisingly high physical characteristics, including extremely high thermal conductivities.

Following formation, disclosed carbon nanosheets can be further processed as desired. For instance, as formed, carbon nanosheets are insoluble, and their dispersion in organic or aqueous media is subject to aggregation and/or restacking effects (i.e., the reverse of exfoliation). Accordingly, chemical modification and functionalization of formed carbon nanosheets is disclosed herein that can, in one embodiment, increase solubilization and improve fabrication of nanocomposite materials.

Beneficially, disclosed methods can provide an economical, relatively simple route for formation of carbon nanosheets, and can also provide a facile route to functionalization of the formed carbon nanosheets. More specifically, by use of the formation methods previously described, in addition to forming the carbon nanosheets, reactive groups can be formed on the carbon nanosheets that can be available for binding a secondary material to the carbon nanosheets.

Figure 5:
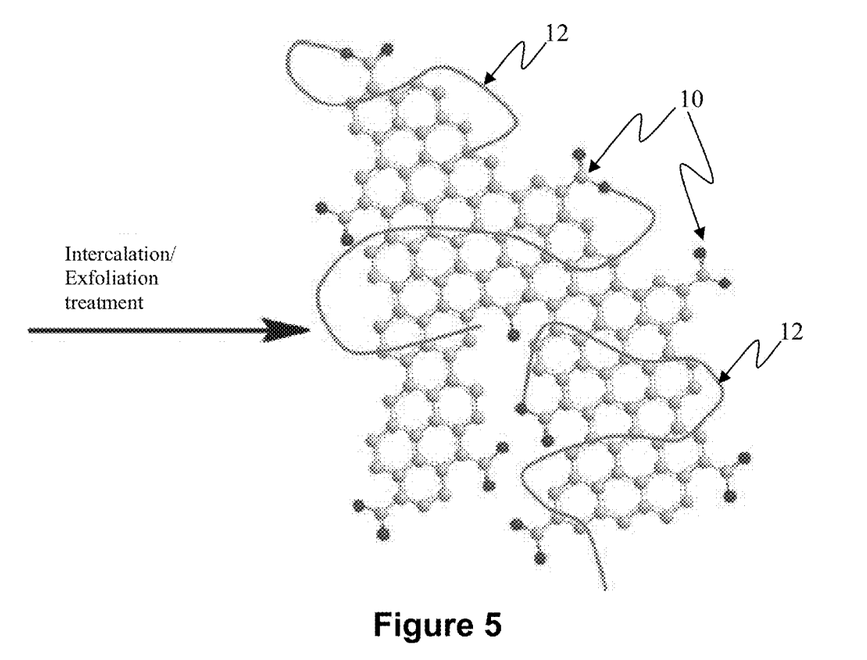
FIG. 5 schematically illustrates the binding of a polymer to carboxylic acid moieties at edges and surface defects of disclosed carbon nanosheets.

As described, the final intercalation/exfoliation treatment of a disclosed process can include treatment with an intercalant, e.g., an acid mixture, coupled with exfoliation, as previously described. As illustrated in FIG. 5, this oxidation treatment can create carboxylic acid moieties 10 at the edges and surface defect sites of the carbon nanosheets. The carboxylic acid moieties can then be utilized in functionalizing the carbon nanosheets as desired. For instance, in a typical formation process, the carboxylic acid population of a formed carbon nanosheet sample can be about 2 mole %, corresponding to about one carboxylic acid per about 50 carbons.

Carboxylic acid moieties 10 can be utilized to bind a polymer 12 to the nanosheets. For example, a polymer as can be utilized in forming a composite matrix can be bound to the nanosheets, which can improve the solubility of the carbon nanosheets in a solution of the polymer. Solution-phase processing of polymer-carbon nanosheets composites can then be carried out. In one preferred embodiment, functionalization of carbon nanosheets with a matrix polymer can allow solution-phase formation of a composite material with no additional compounds, e.g., surfactants, dispersion agents, etc., necessary in solution.

Carbon nanosheets can be functionalized with any suitable compound, and are not limited to functionalization with matrix polymers as discussed above. For instance, polymers other than matrix polymers can be bound to the carbon nanosheets as well as monomeric compounds or other types of functional agents. In one embodiment, compounds for improving dispersion of carbon nanosheets in a non-polymeric matrix can be bound to the carbon nanosheets. By way of example, diamine-terminated polyethylene glycol oligomer (molecular weight~1500) can be bound to the carbon nanosheets to improve dispersion of the materials. In addition, polymer precursors such as modified epoxy resin molecules can be used for the functionalization, followed by polymerization if so desired.

According to another embodiment, biologically-based materials can be bound to disclosed carbon nanosheets such as polypeptides, e.g., functional protein fragments or entire proteins, and so forth. In general, any compound that can covalently or noncovalently bind carboxylic acid moieties of the carbon nanosheets can be utilized as described herein.

Disclosed functionalized or non-functionalized carbon nanosheet fillers can be incorporated into a polymer system according to standard melt processing or solution processing methods. For instance, in one embodiment, carbon nanosheet fillers can be incorporated into thermoset polymer systems, such as epoxy, polyurethane, polyurea, polysiloxane or alkyds, where polymer curing involves coupling or crosslinking reactions.

Disclosed carbon nanosheet fillers can also be utilized with thermoplastic polymer systems including, without limitation, polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactons, polylactides, polyimides, polyolefins (vinyl-containing thermoplastics), polypropylene, nylon and polycarbonate.

It should be understood that carbon nanosheet fillers are not limited to formation of polymeric composite systems. For example, the fillers can also be incorporated into ceramic, glass, carbon and metal composite systems according to known composite forming processes.

In general, a composite as disclosed herein can include up to about 80% by weight of a carbon nanosheet filler. For instance, a composite can include between about 5 vol. % and about 50 vol. % carbon nanosheet filler, or in one embodiment, between about 20 vol % and about 35 vol % carbon nanosheet filler.

Polymeric nanocomposites including carbon nanosheets as filler can be highly anisotropic with regard to thermal conductive properties, with a large ratio between in-plane and cross-plane thermal conductivities. For example, nanocomposite thin films of epoxy including 33 vol % carbon nanosheets can exhibit cross-plane thermal diffusivities that are about one-tenth to one-fifth of the average in-plane value. The highly anisotropic nature of thermal conductivities of disclosed nanocomposites is likely a reflection of the pseudo-two-dimensional structure of the carbon nanosheets and their associated two-dimensional thermal conductive properties.

At comparable loading levels, carbon nanosheets can be more effective fillers than carbon nanotubes (both single-walled and multiple-walled) for highly thermal conductive polymeric nanocomposites. It is acknowledged in the literature that mechanistically, the thermal conductivity in polymeric nanocomposites is limited by the polymer-nanofiller interfacial thermal resistance. The heat transport in polymeric nanocomposites is carried out by phonons with different frequencies, and the phonons slow down at the polymer-nanofiller interface due to material characteristics such as the polymer being largely amorphous in nature. While not wishing to be bound by any particular theory, it is difficult to hypothesize any fundamental difference in polymer-carbon interfaces depending upon whether the carbon is in the form of a nanotube or a nanosheet. Rather, it is believed that a carbon nanosheet, as a two-dimensional filler, reduces the overall number of polymer-filler interfaces for heat transport in the resulting polymeric nanocomposites.

Beneficially, according to the present disclosure, relatively inexpensive starting graphitic materials can be processed according to relatively simple and inexpensive methodology to form fillers that can be incorporated with a wide variety of matrix materials to produce nanocomposites with extremely high thermal conductivities. Accordingly, disclosed methods and products can prove highly valuable in many technological applications.

The present subject matter may be better understood with reference to the Examples, set forth below.

EXAMPLES

Materials and Methods

Expanded graphite (surface enhanced flake graphite, grade 3805) was supplied by Asbury Carbons of Asbury, N.J.

Bisphenol A epoxy-based polymer (EPONOL resin 53-BH-35, MW~26,000) in a solvent mixture of methyl ethyl ketone and propylene glycol monomethyl ether was obtained from Hexion Specialty Chemicals of Columbus, Ohio. The polymer was recovered by first the precipitation into water and then a complete removal of water.

Poly(vinyl alcohol) (PVA, MW~70,000-90,000) was purchased from Aldrich Chemistry, and LaRC CP-2 polyimide (Mn~17,000, from the condensation of 4,4'-(hexafluoroisopropylidene)-diphthalic anhydride and 1,3-bis-(3-aminophenoxy)benzene) was purchased from SRS, Inc. of Gallatin, Tenn. These polymers were used as received.

Sulfuric acid (93%), nitric acid (73%), and ethanol were obtained from Acros Organics, and dimethylformamide (DMF) from Mallinckrodt of Hazelwood, Mo.

X-ray powder diffraction measurements were carried out on a Scintag XDS-2000 powder diffraction system. Raman spectra were measured on a Jobin Yvon T64000 Raman spectrometer equipped with a Melles-Griot 35 mW He—Ne laser source for 633 nm excitation, a triple monochromator, an Olympus BX-41 microscope, and a cooled Symphony detector. Atomic force microscopy (AFM) images were obtained in the acoustic AC mode on a Molecular Imaging PicoPlus system equipped with a multipurpose scanner for a maximum imaging area of 10 μm×10 μm and a NanoWorld Pointprobe NCH sensor (125 μm in length). The height profile analysis was assisted by using the SPIP software distributed by Image Metrology. Transmission electron microscopy (TEM) was performed on a Hitachi HD-2000 S-TEM system and a Hitachi H-9500 TEM system, and the selected area diffraction (SAD) on the latter. Carbon- or holey carbon-coated copper grids were used in the imaging experiments. For cross-sectional imaging, a film sample was first embedded into epoxy resin and then microtomed to slices of less than 100 nm in thickness by using a Reichert-Jung Ultracut E Microtome with a 30° angle diamond knife at room temperature.

The in-plane thermal diffusivity in free-standing polymeric nanocomposite thin films was determined on an Ulvac LaserPIT thermal diffusivity/conductivity meter operated at room temperature and in a vacuum of 0.01 Pa. The thin films measured were about 30 mm×4 mm in size, with one surface (facing the laser in the instrument) coated with a thin layer of graphite. At least three frequencies were used in the measurement of each film sample, and the readings were averaged for the specific specimen. The cross-plane thermal diffusivity results of the film samples were obtained on a Netzsch LFA 447 NanoFlash instrument.

The density and specific heat of the nanocomposite were estimated from those of the polymer and filler in terms of commonly used mixing rule: Composite=$w_{polymer}$Polymer+$w_{filler}$Filler, where w denotes weight fractions.

Example 1

The as-supplied expanded graphite sample was processed with a combination of alcohol and oxidative acid treatments. In a typical experiment, a sample (1 g) was added to an ethanol-water mixture (13:7 v/v, 400 mL), stirred at room temperature for 24 h, and then sonicated (VWR-250D, 120 W) for another 20 h. The sample was collected via filtration and then dried in a vacuum oven. A portion of this sample (500 mg) was added to a nitric acid-sulfuric acid mixture (1:3 v/v, 80 mL) pre-cooled in an ice bath. Upon sonication for 2-3 days, the mixture was transferred into water (1 L). Following, the processed graphite was collected via filtration, washed repeatedly with deionized water until neutral pH, and dried in a vacuum oven.

Figures 1A, 1B, 1C, 1D:
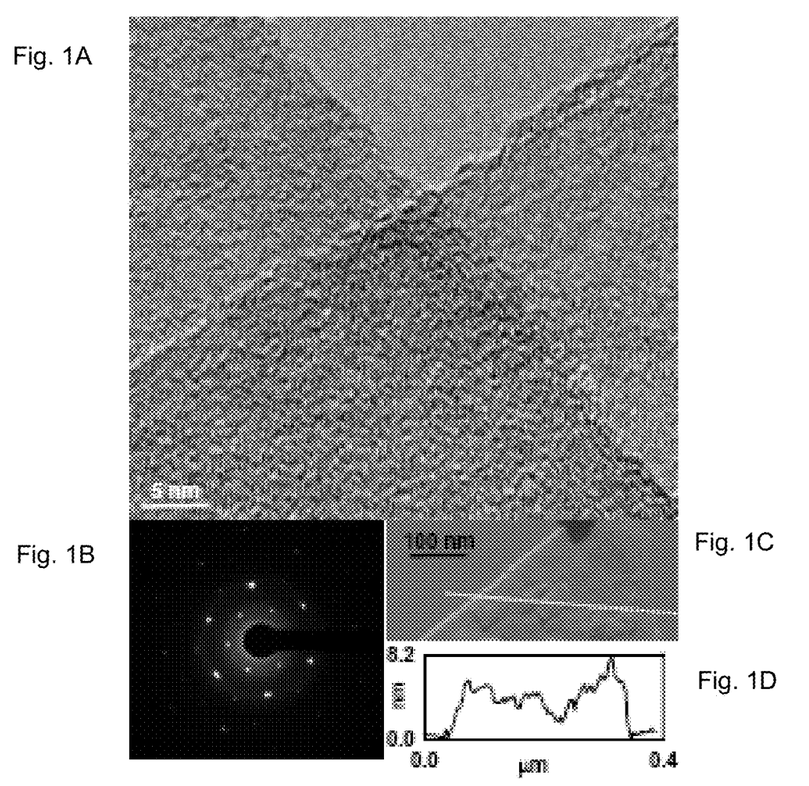
FIGS. 1A-1D include a transmission electron microscopy (TEM) image showing folded edges of two graphite nanosheets (FIG. 1A) and their corresponding electron diffraction pattern (FIG. 1B), also an AFM (tapping-mode) image of a graphite nanosheet (FIG. 1C) with height profile along the dashed line (FIG. 1D).

A typical image from transmission electron microscopy (TEM) analyses of the processed sample is shown in FIG. 1A. The edges of the carbon nanosheets (which tend to scroll and fold, as seen in the image) were used to estimate the thickness of the nanosheets, generally on the order of 2-8 nm. The electron diffraction patterns shown in FIG. 1B correspond to two dominant periodicities of 2.13 Å and 1.23 Å, similar to those reported in the literature on thin crystalline graphene sheets.

Shown in FIG. 1C is a typical AFM image of carbon nanosheets from the processed sample on mica surface, where the height profile (FIG. 1D) is consistent with the thickness estimate for the nanosheets in TEM analyses discussed above.

For average properties at the bulk sample level, the powder X-ray diffraction results before and after the alcohol and oxidative acid treatments showed a slight increase in the interlayer distance, but more meaningfully, a significant broadening in the diffraction peaks of the post-treated sample. According to the Scherrer equation calculation based on the peak broadening, the average graphite layer thickness decreased from the more than 20 nm in the pre-treated sample to the 6-7 nm in the post-treated sample, again in reasonable agreement with the TEM results.

The Raman spectroscopy results for the same samples were also consistent as to the substantial presence of carbon nanosheets, The observed Raman G-band shifted to higher frequencies, indicative of a smaller number of graphene layers.

Example 2

An epoxy polymer sample was dissolved in hot DMF (about 5 mg/mL). Separately, a carbon-nanosheets sample (50 mg), formed as described above in Example 1, was suspended in DMF (10 mL) via sonication for 1 h. The suspension was added dropwise to the hot DMF solution of epoxy (10 mL) under stirring. The mixture was concentrated, stirred vigorously for 12 h, and then cast into thin films (30-80 microns in thickness) on etched glass slides in a glove-box under nitrogen atmosphere. The slides were immersed in water for 30 min to allow the nanocomposite thin films to release, and the free-standing films were subsequently dried in a vacuum oven (80-100° C.) before characterization and measurements.

The in-plane thermal diffusivity of a free-standing film was determined at room temperature on an instrument based on the laser-heating angstrom method (Ulvac LaserPIT). At the carbon filler content of 33 vol % in epoxy nanocomposite thin films (those from repeated fabrications under the same conditions), the experimentally measured in-plane thermal diffusivity averaged 35 mm$^2$/s (as high as about 40 mm$^2$/s for some of the samples), several orders of magnitude higher than the value of 0.12 mm$^2$/s of the blank epoxy film.

The thermal conductivity ($\lambda$) was calculated from thermal diffusivity (D) in terms of the equation $\lambda = \rho C_p D$, where $\rho$ (density) and $C_P$ (specific heat) for the nanocomposite were estimated from those of the polymer and the filler in terms of the commonly used mixing rule. Again, for the epoxy nanocomposites with 33 vol % carbon nanosheets, the thermal conductivity $\lambda$ values thus calculated, close to 80 W m$^{-1}$K$^{-1}$ on average, were much higher than those ever reported in the literature for composites of epoxy or any other polymers with exfoliated graphite fillers. For example, the previously reported high thermal conductivity in composites of Ultem™ 1000 resin with expanded graphite was less than 7 W m$^{-1}$K$^{1}$ at comparable graphite loadings.

Figure 2:
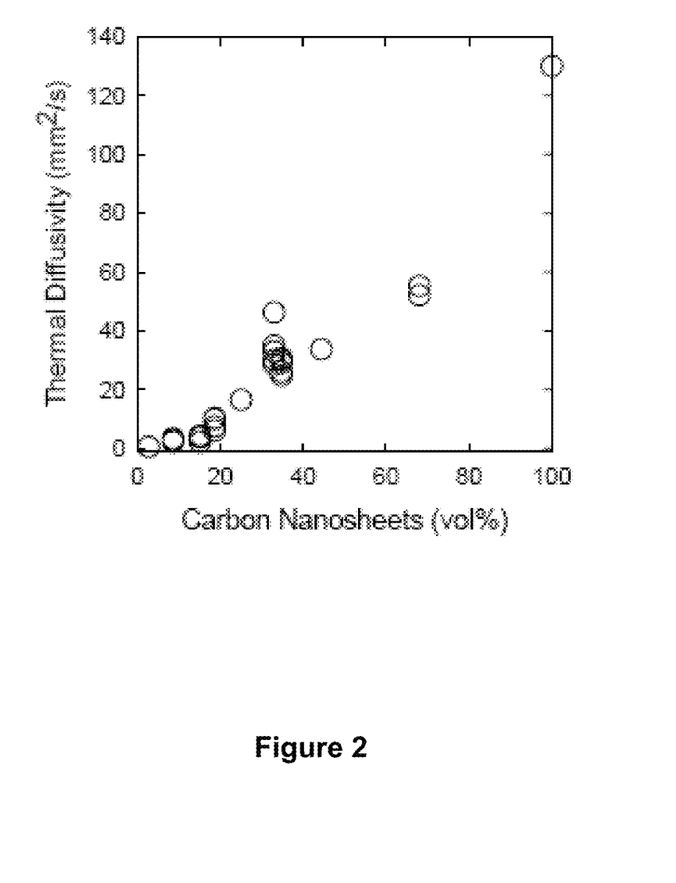
FIG. 2 illustrates the dependence of observed thermal diffusivity on carbon nanosheet loading in epoxy nanocomposite thin films formed as described herein.

The thermal diffusivity of the polymeric nanocomposite was strongly dependent on carbon nanosheets contents, with higher volume fractions of the nanosheets consistently resulting in higher thermal diffusivities of the nanocomposites. This is demonstrated in FIG. 2, which illustrates the dependence of observed thermal diffusivities on volume fractions of the nanosheets in the epoxy-carbon nanocomposite thin films.

Figures 4, 4A, 4B:
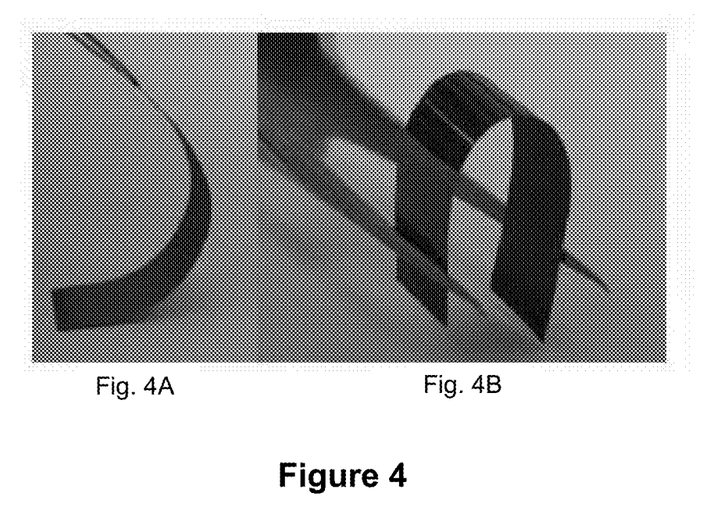
FIGS. 4A and 4B are photographs of an epoxy nanocomposite thin film formed as described herein (35 vol % loading of the carbon nanosheets) showing the flexibility of the formed film.

The polymeric nanocomposites with carbon nanosheets appeared black in color, but remained elastic even at relatively high carbon loadings. For the epoxy nanocomposite thin film with 35 vol % loading of the carbon nanosheets, the photographs in FIGS. 4A and 4B demonstrate the high degree of flexibility of this film. The polymeric nanocomposites with lower loadings of the carbon nanosheets were even more elastic and processable (melt-extruded into fiber-like structures and flexible tubing, for example).

Example 3

A polyimide polymer (LaRC CP-2 polyimide) was dissolved in DMF. A suspension of the carbon-nanosheets in DMF was prepared via homogenization (Omni International, THP115) for 30 min and then sonication for 30 min. The suspension was added dropwise to the polyimide solution, with stirring. The resulting mixture was concentrated, stirred vigorously for 12 h, and then cast into a thin film on a glass slide in a glove-box under nitrogen atmosphere. The free-standing film was dried in a vacuum oven (80-100° C.) before examination.

The formed film exhibited in-plane thermal diffusivity on the order of 20 mm$^2$/s at similar carbon nanosheets loadings to that for the epoxy nanocomposites discussed above. While less spectacular (compared with the average 35 mm$^2$/s in the epoxy nanocomposites), this thermal diffusivity value was still extremely high for a polyimide polymeric nanocomposites.

Example 4

A PVA polymer was dissolved in hot water. A suspension of the carbon-nanosheets in water was prepared via homogenization (Omni International, THP115) for 30 min and then sonication for 30 min. The suspension was added dropwise to the PVA solution, with stirring. The resulting mixture was concentrated, stirred vigorously for 12 h, and then cast into a thin film on a glass slide in a glove-box under nitrogen atmosphere. The free-standing film was dried in a vacuum oven (80-100° C.) before examination.

The thermal diffusivity of this film was similar to that of the polyimide nanocomposite of Example 3, i.e., on the order of 20 mm$^2$/s at similar carbon nanosheets loadings to those for the epoxy nanocomposites discussed above. This thermal diffusivity value, as with the polyimide nanocomposite film, is record setting for a PVA nanocomposite film.

Figure 3A:
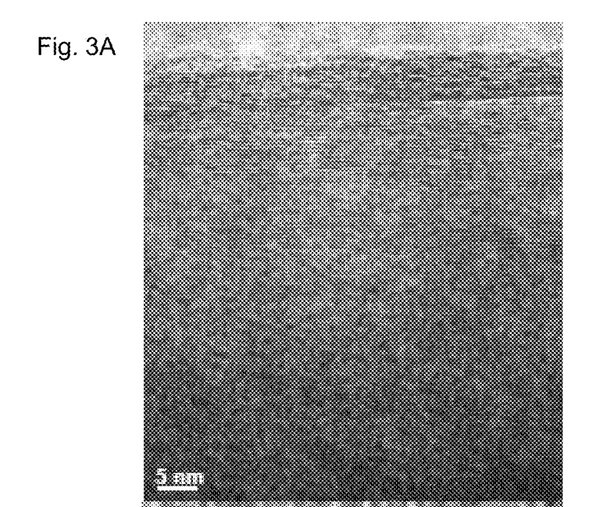
FIGS. 3A-3C illustrate TEM images of increasing resolution of slices from microtomed (cross-sectional) epoxy nanocomposite thin films.
Figure 3B:
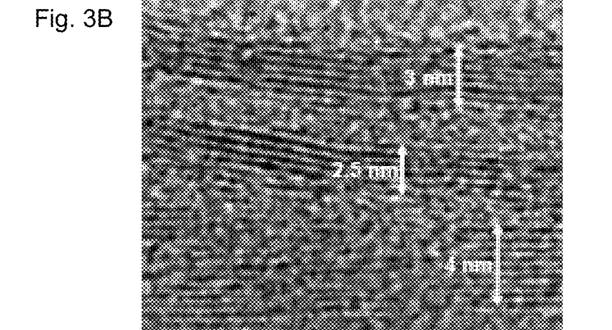
Figure 3C:
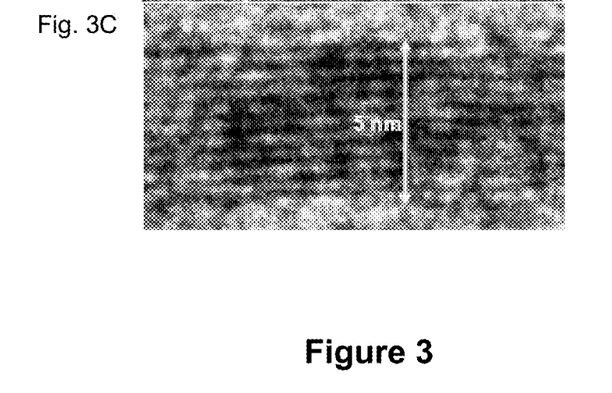

The powder X-ray diffraction results of the carbon nanosheets were generally unchanged after the dispersion into polymeric matrices. Microscopically, the dispersed carbon nanosheets in the nanocomposite thin films were examined in terms of a cross-sectional view in TEM imaging. A thin film was microtomed in the direction perpendicular to the film surface to yield slices of less than 100 nm in thickness (used as specimen for high-resolution TEM imaging). Shown in FIG. 3 are representative TEM images of the epoxy specimen at various resolutions, which essentially correspond to a direct view (from a cross-sectional orientation) of the nanoscale structure in the nanocomposite thin film that was microtomed. These imaging results confirm that the fillers dispersed in the polymer matrix are indeed carbon sheets of nanoscale thickness (generally less than 10 nm).

Example 5

The covalent functionalization of the carbon nanosheets with poly(vinyl alcohol) (PVA, $M_W$~70,000-90,000) was through the carbodiimide-activated esterification reaction between the carboxylic acid moieties on the nanosheets and hydroxyl groups on PVA (FIG. 5).

In the reaction, a dispersion of carbon nanosheets (formed as described above in Example 1) in DMSO was prepared via sonication, and added to a solution of N,N'-dicyclohexylcarbodiimide (DCC), 4-(dimethylamino)-pyridine (DMAP), and N-hydroxybenzotriazole (HOBT) in DMSO. Upon sonication for 1 h, a separately prepared solution of PVA in DMSO was added, followed by sonication for 24 h.

The reaction mixture was precipitated into acetone to recover the functionalized sample. For purification, the sample was dissolved in hot water, and then precipitated into acetone. The procedure was repeated three times, and the resulting sample was washed with acetone in Soxhlet extractor for 12 h to obtain the final PVA-functionalized carbon nanosheets.

According to thermogravimetric analysis (TGA), in which the polymer was selectively removed under nitrogen atmosphere, the functionalized sample contained about 15% by weight of carbon nanosheets.

Figure 6:
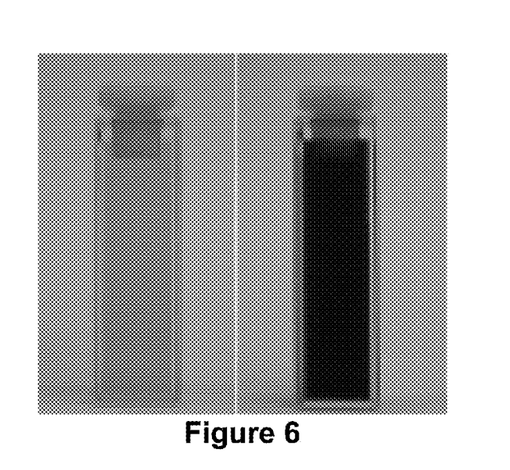
FIG. 6 illustrates aqueous solutions (left: dilute; right: concentrated) of PVA-functionalized carbon nanosheets as described herein.

The PVA-functionalized carbon nanosheets could be readily dispersed in DMSO or hot water to form what appeared as a stable solution (FIG. 6), which enabled characterizations in terms of solution-phase techniques.

The $^1$H NMR spectrum (not shown) of the PVA-functionalized carbon nanosheets in DMSO-$d_6$ solution was generally similar to that of PVA, except that the three hydroxyl proton signals found in the spectrum of PVA (4.2 ppm, 4.5 ppm, and 4.7 ppm for the isotactic, heterotactic, and syndiotactic triad) were diminished in the spectrum of the functionalized sample. The solution-phase $^{13}$C NMR spectra of the functionalized sample and PVA were also similar (not shown).

Figure 7:
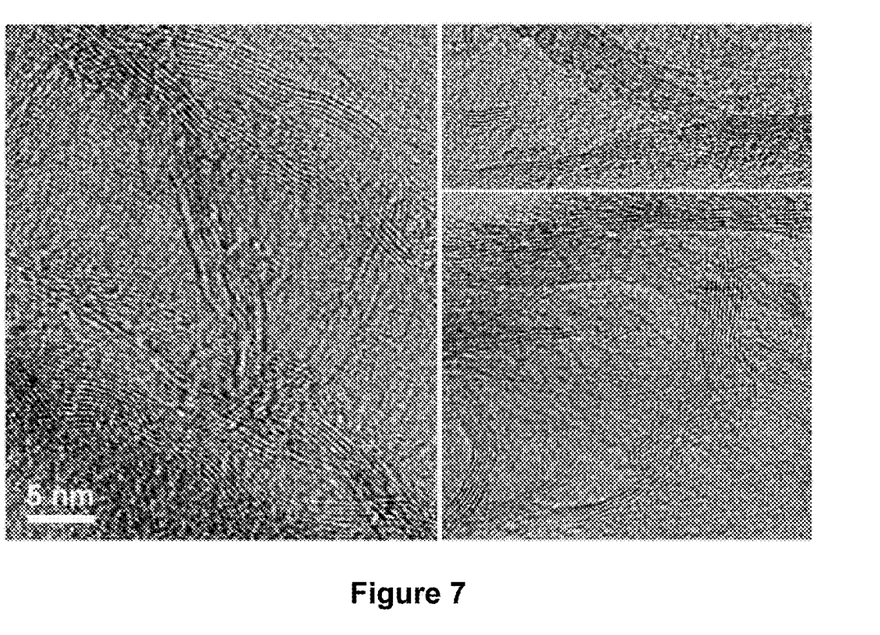
FIG. 7 includes transmission electron microscopy (TEM) images of a microtomed sample of PVA-functionalized carbon nanosheets.

According to TEM imaging of the specimen prepared by microtoming the sample (FIG. 7), the thickness of the functionalized carbon nanosheets was on the order of 5 nm or so (corresponding to around 6-7 graphene layers). The TEM results were generally similar to those of pre-functionalization nanosheets, suggesting that the functionalization reaction had no significant effects on the nanosheet structures.

Figure 8:
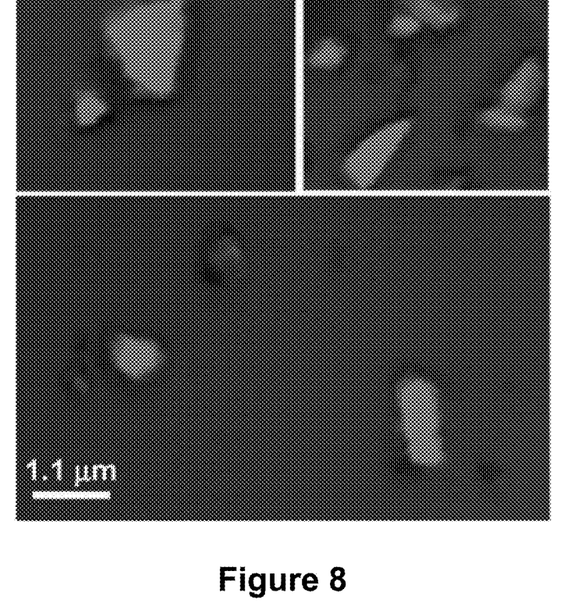
FIG. 8 includes confocal microscopy (reflection mode) images of PVA-functionalized carbon nanosheets as described herein.

A specimen for optical microscopy (Leica DMIRE2 confocal microscope with TCS SP2 SE scanning system) analyses was prepared by depositing a dilute solution of the functionalized carbon nanosheets onto a glass slide. The well-dispersed black objects found in the optical microscopy images did appear as sheets, especially in terms of the imaging in the reflective mode (FIG. 8). The surface shape of the sheets was generally irregular, and the dimension quite diverse, though mostly less than 1.5 μm as measured by the longest edge-to-edge distance. It seems that the solubilization was selective toward those relatively smaller pieces of carbon nanosheets (larger pieces found in the residue).

The properties of PVA polymers in the functionalized sample were affected significantly by their interactions with the attached carbon nanosheets. According to differential scanning calorimetry (DSC) results, the glass transition temperature $T_g$ increased from 70° C. in blank PVA polymer to about 90° C. in the functionalized sample, suggesting that the interactions with the nanosheets reduced the polymer chain mobility substantially.

Figure 9:
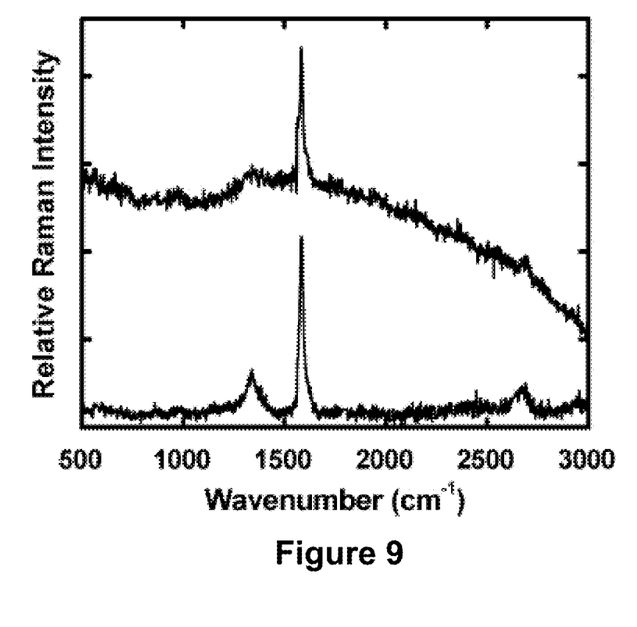
FIG. 9 illustrates Raman spectra of carbon nanosheets before (bottom) and after (top) PVA functionalization.

The Raman spectrum of the functionalized sample was generally similar to that of the pre-functionalization nanosheets, except for some luminescence background (FIG. 9), as also observed in functionalized carbon nanotubes.

Figure 10:
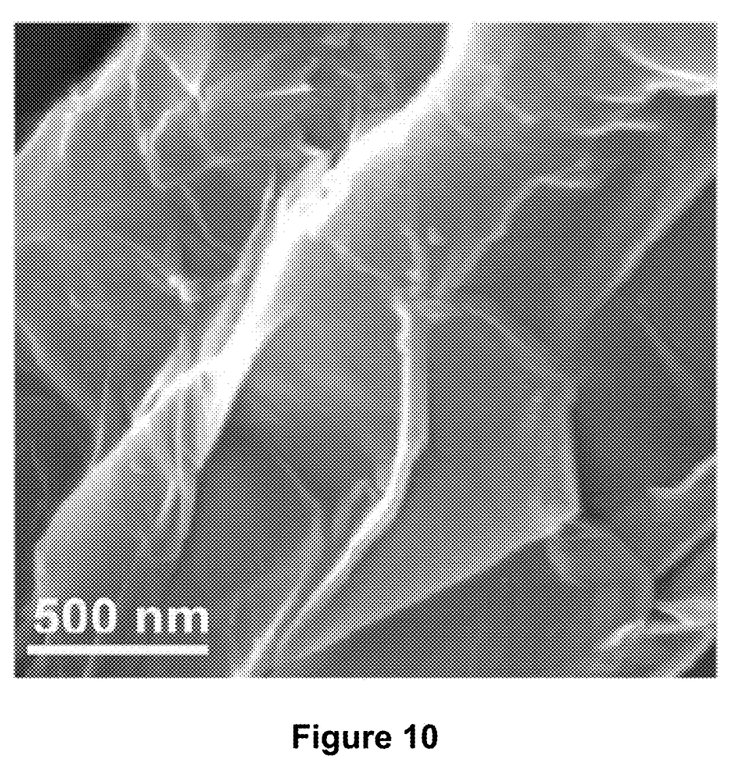
FIG. 10 is a representative scanning electron microscopy (SEM) image on fracture surfaces of a PVA-carbon nanosheets composite film.

The aqueous solution of the PVA-functionalized carbon nanosheets was concentrated for the casting into an elastic thin film. The film was mechanically stretched to failure for an examination of the broken edges by using scanning electron microscopy (SEM). As shown in FIG. 10, the SEM imaging results were consistent with the expected well-dispersion of carbon nanosheets in the PVA polymer matrix.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A method for forming a carbon nanosheet comprising:
   combining an expanded graphite with a mixture comprising water and an alcohol to form a graphite mixture;
   sonicating the graphite mixture;
   combining the graphite mixture with an intercalant subsequent to the sonication step to form a final intercalated graphite; and
   exfoliating the final intercalated graphite to form a final exfoliated graphite, the final exfoliated graphite comprising a carbon nanosheet having a thickness of between about 2 nanometers and about 10 nanometers.

2. The method according to claim 1, further comprising mixing the graphite mixture prior to the sonication step.

3. The method according to claim 2, wherein the graphite mixture is stirred for a period of time between about 12 hours and about 72 hours.

4. The method according to claim 1, wherein the expanded graphite is an initial exfoliated graphite.

5. The method according to claim 1, wherein the expanded graphite is an initial intercalated graphite.

6. The method according to claim 1, further comprising forming the expanded graphite.

7. The method according to claim 1, wherein the mixture comprising the water and the alcohol includes the water and the alcohol in a volume ratio of between about 1:9 and about 9:1.

8. The method according to claim 1, wherein the alcohol is selected from the group consisting of methanol, ethanol, and propanol.

9. The method according to claim 1, wherein the alcohol is a diol.

10. The method according to claim 1, wherein the intercalant comprises a strong acid.

11. The method according to claim 1, wherein the intercalant comprises nitric acid and sulfuric acid.

12. The method according to claim 1, wherein the final intercalated graphite is exfoliated by milling, by sonication, by the application of heat, or by a combination thereof.

13. The method according to claim 1, wherein the graphite mixture is sonicated for a period of time between about 12 and about 72 hours.

14. The method according to claim 1, wherein the graphite mixture is sonicated at a power level of between about 50 W and about 250 W.

15. The method according to claim 1, further comprising binding a compound to a carboxylic acid moiety of the carbon nanosheet.

16. The method according to claim 15, wherein the compound is a polymer.

17. The method according to claim 1, further comprising incorporating the carbon nanosheet into a matrix material to form a composite.

18. The method according to claim 17, wherein the composite comprises a thermoset polymer.

19. The method according to claim 17, wherein the composite comprises a thermoplastic polymer.

20. The method according to claim 17, wherein the matrix material comprises a ceramic, a glass, a carbon, or a metal.

\* \* \* \* \*